Feb. 6, 1940. H. G. INGERSOLL ET AL 2,189,534
FRICTION CLUTCH
Original Filed April 22, 1937 2 Sheets-Sheet 2
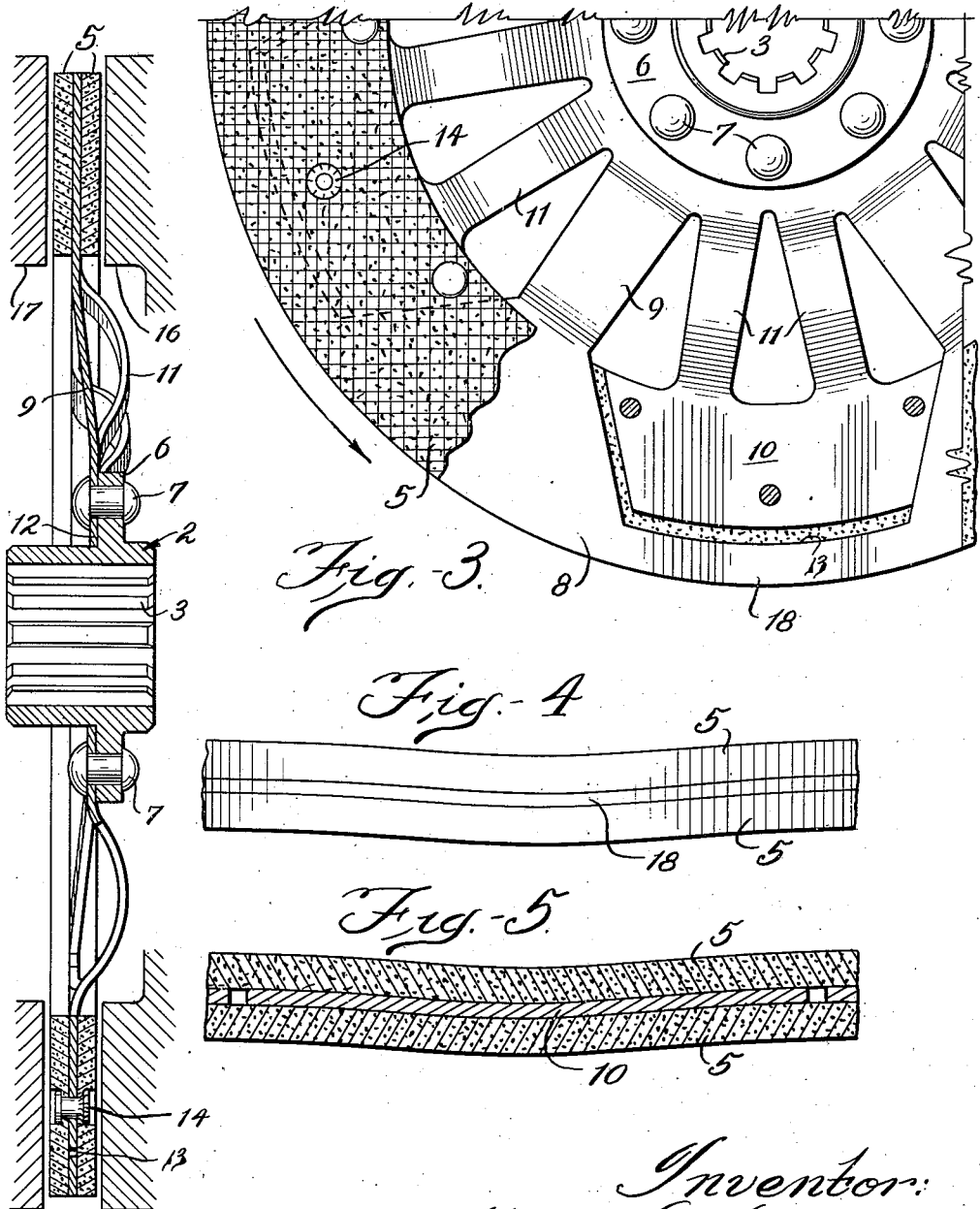

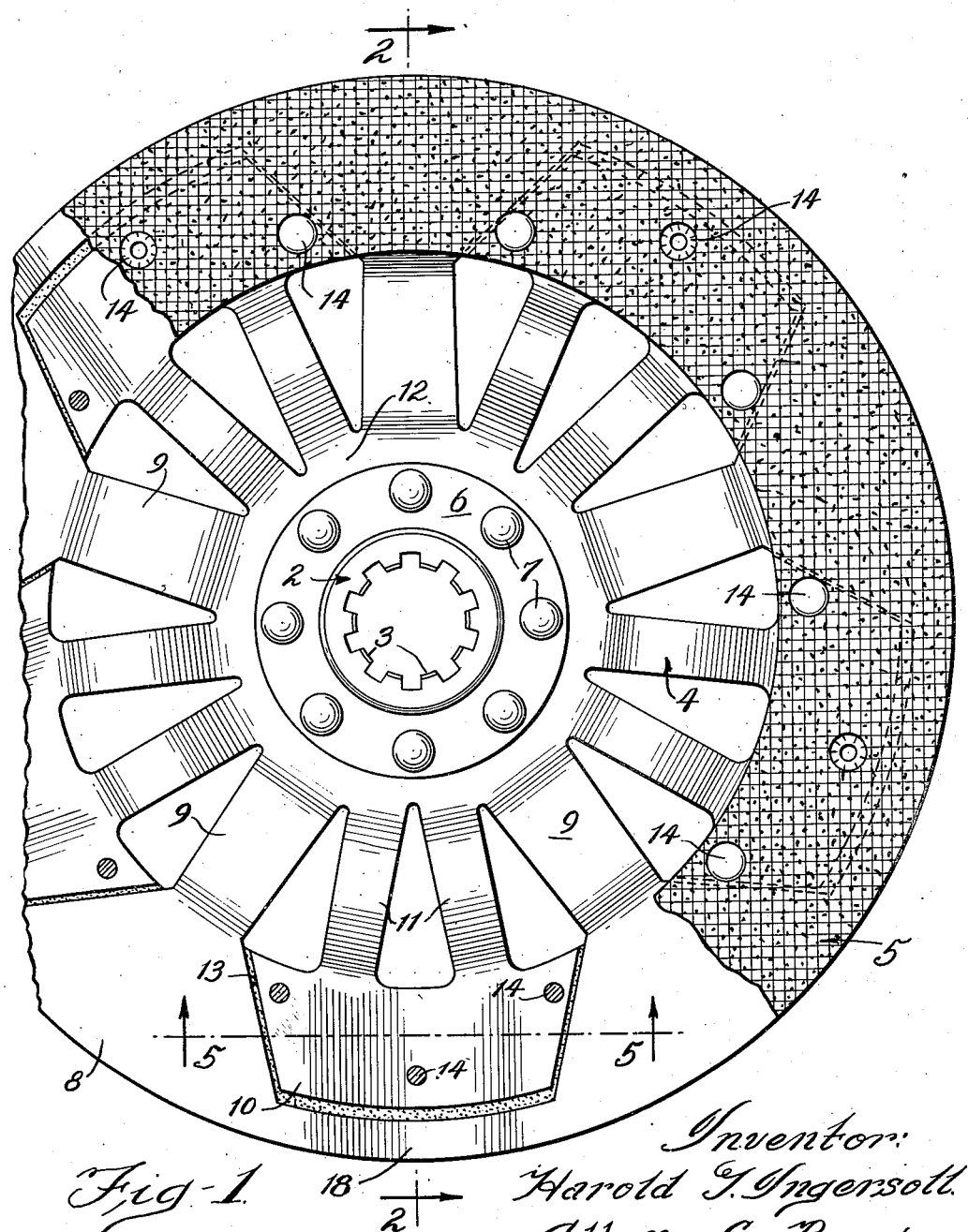

Patented Feb. 6, 1940

2,189,534

UNITED STATES PATENT OFFICE 2,189,534

FRICTION CLUTCH

Harold G. Ingersoll and Alton C. Borg, New Castle, Ind., assignors to Borg-Warner Corporation, Chicago, Ill., a corporation of Illinois Application April 22, 1937, Serial No. 138,312
Renewed November 29, 1937

15 Claims. (Cl. 192—68)

Our invention relates to improvements in friction clutches and more particularly to the driven plate assembly of friction clutches of the type intended for use in motor vehicles.

Modern automobile design demands that the friction clutch employed frictionally to engage and to permit disengagement of the engine to and from the transmission drive shaft provide in addition to its normal function, the added function of dampening torsional vibration which might otherwise be transmitted between the engine and the transmission gear train of the vehicle.

It is an object, therefore, of our invention to provide an improved friction clutch plate incorporating a novel and efficient torsional dampening means without appreciably increasing the cost of construction of the plate with respect to one of generally corresponding structure not possessing torsional dampening characteristics.

Another object is to provide a friction clutch plate, as described, which, in addition to the dampening of torsional vibration through a resilient driving connection, operates to discourage so-called "hunting". This advantage is attained by providing a braking action as between the friction facings and the friction facing supporting assembly of the plate, operable to dampen oscillation of the resilient drive connection in less than one complete cycle.

A further object of our invention is to provide a driven clutch plate, as described, which may be constructed from a single metal stamping, a rigid hub member and conventional friction facings.

Other objects, the advantages and uses of our invention, will become apparent after reading the following specification and claims, and after consideration of the drawings forming a part of the specification, wherein:

Fig. 1 is an elevation of a driven clutch plate constructed in accordance with our invention, portions thereof being broken away;

Fig. 2 is a sectional view along the line 2—2 of Fig. 1;

Fig. 3 is a fragmentary view similar to Fig. 1 illustrating the position of the parts when the plate is subjected to high torque;

Fig. 4 is a fragmentary side elevation of the plate illustrated in Fig. 1; and

Fig. 5 is a sectional view along the line 5—5 of Fig. 1.

We have selected for illustration herein a driven clutch plate of the type intended for use in the friction clutch of a motor vehicle. With reference to the drawings, the clutch plate may comprise a hub member 2 internally splined, as indicated at 3, for driving engagement with the drive shaft of the motor vehicle transmission (not shown), a stamped sheet steel disc 4 fixed to the hub and supporting at its outer portion friction facings 5 of conventional woven or composition material.

The hub 2 may be formed with an integral flange 6 to which the inner portion of the disc 4 may be rigidly secured by rivets 7 arranged in circumferential array. The disc 4 comprises essentially, three portions, the inner portion which is that portion secured to the hub flange 6, an intermediate spoked portion and a rim portion, the latter being that portion upon which the friction facings 5 are disposed. The rim portion of the disc may comprise an endless annular region 8 interconnected with the inner portion of the disc by a plurality of radial spokes 9 and a plurality of cut away sections 10, each of which is connected to the inner portion of the disc by a pair of radially bowed spoke portions 11. The sections 10 are preferably formed by shearing away a part of the annular region 8 prior to forming the bows in the spokes 11, the latter procedure serving to draw the sections radially inwardly, thus to provide a gap 13 between the edges of each of the sections 10 and the adjacent edges of the body of the rim portion.

Referring to Fig. 2, it will be noted that in the plate illustrated, we have laterally and bodily offset the rim portion of the disc 4 from the plane of the inner portion 12 and that the rim portion 8 and its severed sections 10 lie in a common plane. The offset of the rim portion may be carried out by bending the spokes 9, as shown, with corresponding deflection of the bowed spokes 11.

Inasmuch as the spokes 11 are of lesser width than the spokes 9, and because of their being radially bowed in an appreciable amount, these spokes possess noticeable resiliency and may thus be deflected to permit relative rotation between the sections 10 and the body of the annular rim 8. The friction facings 5 are secured directly to the sections 10 by a plurality of rivets 14 which extend through both facings and openings provided in the intervening sections 10. It is intended that the rivets 14 be drawn sufficiently tight to bind the facings securely to the section 10 and to provide frictional contact between the inner walls of the facings and the adjacent surfaces of the body of the rim portion 8. It will thus be apparent that torque applied to the facings 5, as by frictional engagement with a driving member 16 and cooperating pressure plate 17 (see Fig. 2), will cause torque to be imparted to the hub member 3 through the relatively resilient spokes 11 in part, and in part through the spokes 9 because of the frictional engagement between the facings and rim body.

During normal operation of the clutch plate, it is intended that the sections 10 occupy substantially the position shown in Fig. 1 with some slight sidewise deflection due to the yielding of the spokes 11. The plate when operating in this manner serves yieldably to transmit torque between the friction facings and the hub assembly, slight relative rotary movement between facing and hub assembly being permitted because of the flexibility of the spokes 11. Such relative rotary movement possesses the function of the elimination of vibration through torque otherwise unyieldingly transmitted through the clutch plate. If, however, the clutch plate is subjected to torque in an amount greater than its normal capacity, the leading edges of the sections 10 may contact with the adjacent edges of the rim body, as indicated in Fig. 3, thus to close the gaps 13 at such leading edges to establish a positive driving connection between the friction facings fixed to the sections and the annular rim portion of the disc. This function of our improved clutch plate precludes damage to the resilient spokes of the disc under excessive torque.

In order further to improve the dampening characteristics of our improved clutch plate, we curve each of the sections 10 and the radially adjacent region 18 of the rim body in a plane perpendicular to the radius of the plate (see Figs. 4 and 5). This curvature of the sections and adjacent rim portion causes a similar curvature of the friction facings 5 which are tightly secured to each of the sections 10, and provides a braking action between the facings and the relatively stationary portion of the disc, i. e., the body of the rim portion 8. The frictional engagement so produced between the friction facings and the rim is sufficient to dampen oscillation between facing assembly and hub in less than one cycle. The advantage of such braking action is the elimination of so-called "hunting" which is of common occurrence in yielding drive connections where relative rotation through resilient means occurs.

We have provided in our improved clutch plate an efficient torsion dampening structure that may be manufactured at relatively low cost, and wherein the entire facing supporting assembly directly carried by the hub is constructed of a single sheet steel stamping. In operation, the clutch plate serves yieldingly to transmit torque applied to the friction facings as during their compression between opposed driving members of the type indicated at 16 and 17 in such manner that relative rotation between the friction facings and the hub member take place within predetermined limits. These limits are predetermined by the width of the gap between the sections 10 and the adjacent edges of the rim body 8 from which the sections are severed. During such relative rotation of the parts during their normal function of opposing the transmission of torsional vibration, the amplitude of such relative rotary movement is dampened to zero amplitude in substantially less than one complete cycle of oscillation because of the frictional contact between the inner sides of the friction facings, carried by the sections 10, and the relatively large contacting surfaces of the rim body 8. This action is augmented by the curvature of the radially aligned portions of the sections 10 and rim body as illustrated in Figs. 4 and 5.

We claim:

1. In a friction plate, a stamped sheet steel disc comprising, an inner and central portion having an opening therethrough adapted to receive a hub member, an outer annular rim portion and an intermediate portion, the latter having the form of a plurality of spokes, said rim portion having sections, at the outer ends of certain of said spokes, severed from but disposed in the plane of the body thereof, the spokes interconnecting said sections with said inner portion being distorted whereby to provide a gap between the edges of the severed sections and the adjacent edges of the body of said rim portion.

2. In a friction clutch plate, a sheet metal disc comprising, a center portion adapted for mounting upon a hub member, a plurality of relatively resilient spokes extending outwardly from said center portion and terminating at their outer ends in circumferentially spaced friction facing supporting elements, and a plurality of relatively non-resilient spokes extending outwardly from said center portion and terminating at their outer ends in an endless rim, portions of which lie between said circumferentially spaced supporting elements and in a plane common thereto.

3. In a friction clutch plate, a sheet metal disc, as defined in claim 2, wherein said relatively resilient spokes are arranged in a plurality of groups, the spokes of each group serving to interconnect said center portion with one of said supporting elements.

4. In a friction clutch plate, a stamped sheet steel disc comprising, an inner and central portion having an opening therethrough adapted to receive a hub member, an outer annular rim portion located in a plane parallel to but spaced away from the plane of said inner central portion, and an intermediate portion having the form of a plurality of spokes, said rim portion having sections, within the periphery thereof and at the outer ends of certain of said spokes, severed therefrom but located in the plane of the body of the rim portion, the spokes interconnecting said sections with said inner portion being bowed radially whereby to draw the sections radially inwardly and to provide a gap between the edges of the severed sections and the adjacent edges of the body of the rim portion.

5. In a friction clutch plate, a sheet metal disc, as defined in claim 2, wherein each of said relatively resilient spokes is bowed radially.

6. In a friction clutch plate, a stamped sheet steel disc as defined in claim 1, wherein said sections of said rim portion are normally free of contact with the body of said rim portion but in which relative circumferential movement between the sections and the said body of the annular rim portion is limited by contact of the adjacent edges thereof.

7. A friction clutch plate comprising a hub, a metal disc including an inner portion secured to said hub, an outer annular rim portion and an intermediate portion comprising a plurality of spokes, said rim portion having sections, at the outer ends of certain of said spokes, severed from but disposed in the plane of the body thereof, the spokes interconnecting said sections with said inner portion being bodily distorted whereby to provide a gap between the edges of the severed sections and the adjacent edges of the body of the rim portion, and friction facings located one on each side.

8. A friction clutch plate, as defined in claim 7, wherein said friction facings are secured to said rim sections.

9. In a friction clutch plate, a stamped sheet steel disc therefor as defined in claim 4, wherein said sections and the adjacent radially outward regions of the body of said rim portion are curved in planes perpendicular to the radii of said disc, and wherein each section is provided with rivet openings adapted to receive rivets for securing friction facings thereto.

10. A friction clutch plate comprising, a hub, a plurality of facing supporting elements in annular array about and radially spaced from said hub, flexible means for drivingly connecting said elements with said hub, friction facings disposed on opposite sides of said elements and fixed thereto, and rigid means fixed relative to said hub and extending between said facings but normally out of contact with said facing supporting elements.

11. A friction clutch plate as defined in claim 10, wherein said supporting elements are adapted by torsional flexing of said flexible means under relatively high clutch load to engage said rigid means, whereby to provide a limit stop for the circumferential movement of said supporting elements relative to said hub.

12. A friction clutch plate as defined in claim 10, wherein said flexible means comprise relatively narrow spokes interconnecting said hub and said elements, and said rigid means comprise relatively broad spokes fixed with respect to said hub at their inner ends and having at their outer ends an annulus member with portions cut away normally to clear contact with said supporting elements.

13. A friction clutch plate comprising, a hub, friction facings disposed concentric of said hub and radially spaced therefrom, flexible means interconnecting said hub and said facings, and non-yielding means fixed relative to said hub and adapted frictionally to engage said facings.

14. In a friction clutch plate, a sheet metal disc having a substantially annular portion and a hub portion connected therewith by relatively non-yielding and substantially radially extending portions, said disc further including circumferentially spaced facing supporting portions interconnected with said hub portion by substantially flexible radially extending spoke portions.

15. In a friction clutch plate assembly including, a hub member, friction facing means disposed radially outwardly of said hub member and means extending generally radially between said hub and said facing means including a first resilient means connected in driving relation with said friction facing means and a second substantially rigid means frictionally engaging said facing means.

HAROLD G. INGERSOLL.
ALTON C. BORG.

CERTIFICATE OF CORRECTION.

Patent No. 2,189,534.   February 6, 1940.

HAROLD G. INGERSOLL, ET AL.

It is hereby certified that error appears in the printed specification of the above numbered patent requiring correction as follows: Page 2, second column, line 9, claim 1, after the word "friction" insert clutch; and that the said Letters Patent should be read with this correction therein that the same may conform to the record of the case in the Patent Office.

Signed and sealed this 2nd day of April, A. D. 1940.

(Seal)

Henry Van Arsdale,
Acting Commissioner of Patents.